April 25, 1933.          J. A. HEANY          1,905,866
PROCESS OF PRODUCING YTTRIUM AND METALS OF THE YTTRIUM GROUP
Filed Feb. 8, 1930          3 Sheets-Sheet 1
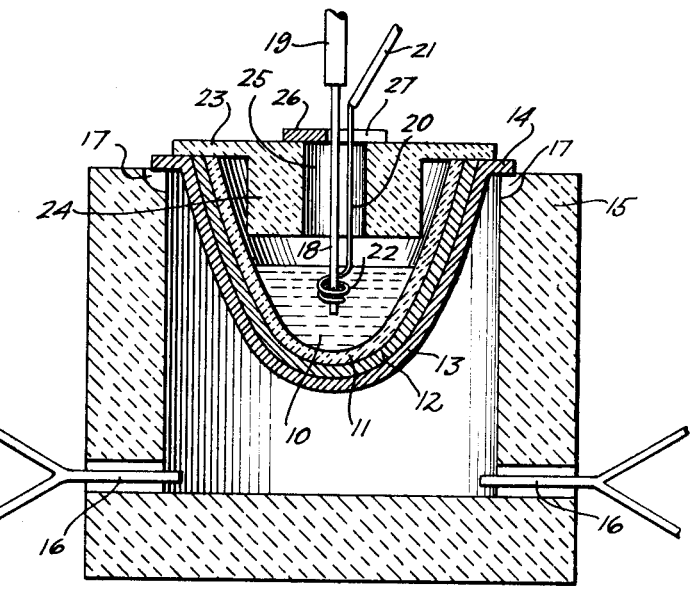
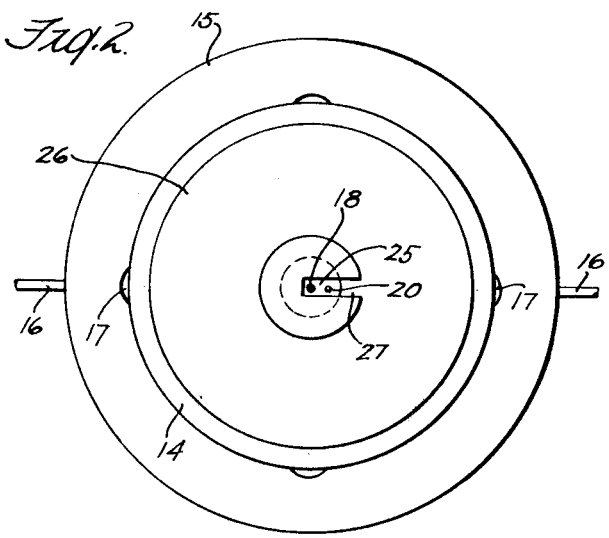
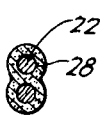
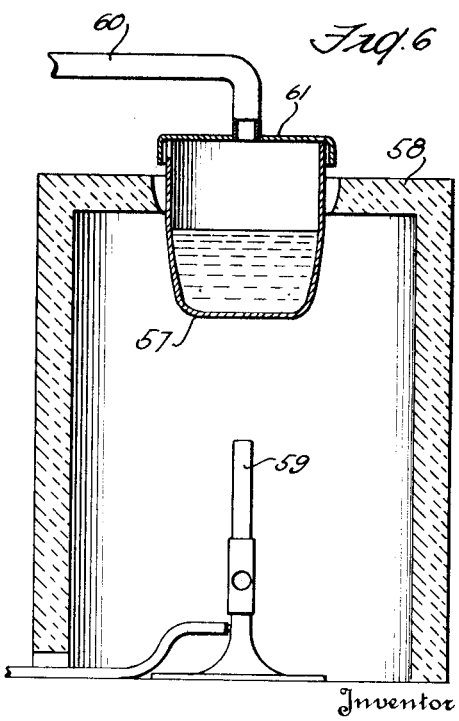
Inventor
John Allen Heany
By Chester H. Biedler
Attorney April 25, 1933.　　　　J. A. HEANY　　　　1,905,866
PROCESS OF PRODUCING YTTRIUM AND METALS OF THE YTTRIUM GROUP
Filed Feb. 8, 1930　　　　3 Sheets-Sheet 2

INVENTOR
John Allen Heany
BY
ATTORNEY

April 25, 1933.   J. A. HEANY   1,905,866
PROCESS OF PRODUCING YTTRIUM AND METALS OF THE YTTRIUM GROUP
Filed Feb. 8, 1930   3 Sheets-Sheet 3

Inventor
John Allen Heany
By Chester H Biwell
Attorney

Patented Apr. 25, 1933

1,905,866

UNITED STATES PATENT OFFICE

JOHN ALLEN HEANY, OF NEW HAVEN, CONNECTICUT, ASSIGNOR TO SIRIAN LAMP COMPANY, OF NEWARK, NEW JERSEY, A CORPORATION OF DELAWARE

PROCESS OF PRODUCING YTTRIUM AND METALS OF THE YTTRIUM GROUP

Application filed February 8, 1930. Serial No. 426,979.

This invention relates to metals of the yttrium group, particularly to metallic yttrium and metallic erbium, in a state capable of withstanding incandescent temperatures, and to a process of producing metals of this group in a state of great purity, and of treating the metals to enable them to be formed into various articles.

The production of metals of the yttrium group from their various compounds presents great difficulty. When these metals have been displaced by more electro-positive metals or by the chemical or electro-chemical methods heretofore employed, the resulting metal has been contaminated with metallic and non-metallic elements that alter or impair its properties. More especially these impurities that have heretofore inevitably accompanied the production of the yttrium metals have given the latter a relatively low melting point and rendered them unsuitable for use at incandescent temperatures, such as are obtained in incandescent lamps or in electric arcs.

An object of the present invention is to provide metallic yttrium or metals of the yttrium group in a state suitable for use at incandescent temperatures, more particularly in a state at which the metal does not melt or fuse, and has no appreciable vapor tension at incandescent temperatures.

Further objects of the invention are: to provide a process whereby yttrium, and metals of the yttrium group, may be prepared in their metallic state in great purity or freedom from those impurities that would impair or destroy those properties desirable for use of the metal at high temperatures; to provide a process for producing metals of the above group or alloys of such metals that may be easily and rapidly operated; to provide a process that may be operative on an extensive scale in apparatus of simple and inexpensive construction; and to provide an electrolytic process for obtaining metals of the above group uncontaminated with the constituents of the electrolytic bath and for effectively and completely isolating the metal from such constituents.

Other objects of the invention are to provide filaments and other articles from metals of the yttrium group and to provide a method of forming metals of the yttrium group into a firm, coherent filament, or into other articles stable at incandescent temperatures.

With these and other objects in view, which will more clearly appear from the following description, the invention comprises the products, methods and apparatus described in the following specification and claims. The various features of the invention are illustrated in connection with the accompanying drawings in which:

Fig. 1 is a vertical sectional view of an electrolytic bath embodying a preferred form of the invention;

Fig. 2 is a plan view of the bath shown in Fig. 1;

Fig. 3 is a sectional view of a part of a cathode used in the electrolytic bath;

Fig. 6 is a sectional view of an apparatus for treating the metal with hydrogen;

Figure 4:
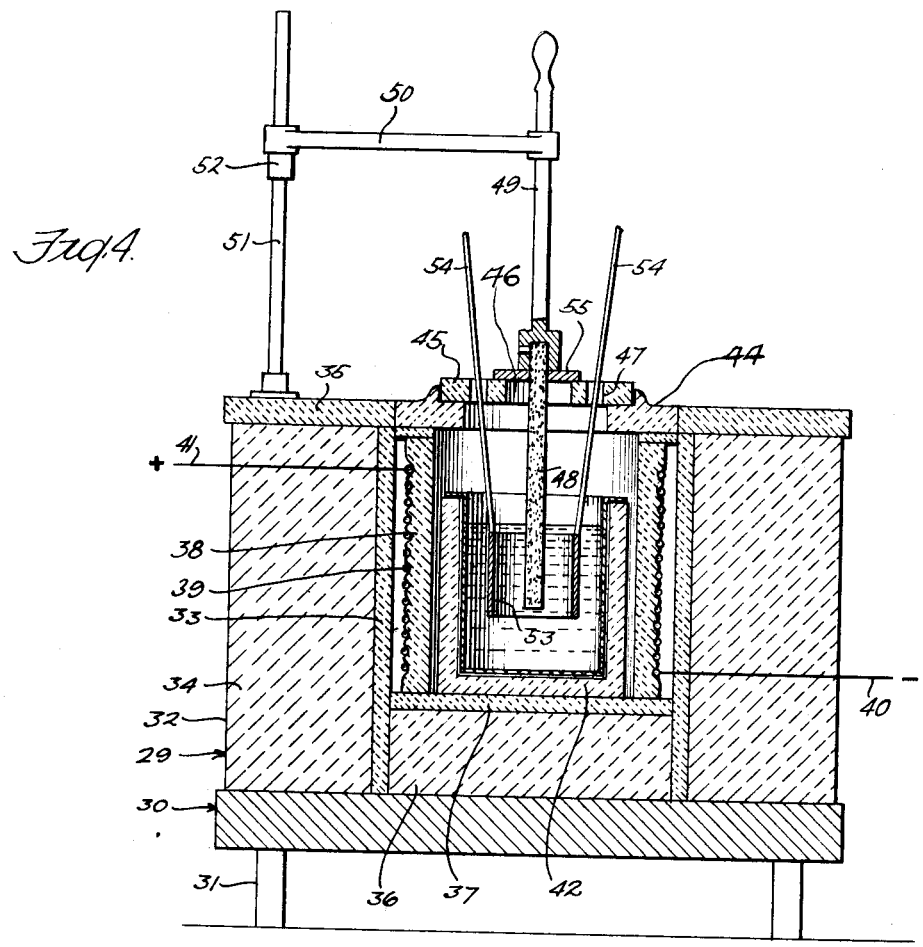
Fig. 4 is a vertical sectional view of a modified form of electrolytic bath.
Figure 5:
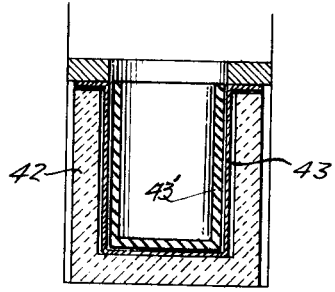
Fig. 5 is a sectional view of an alternative form of bath container for the apparatus shown in Fig. 4.
Figure 8:
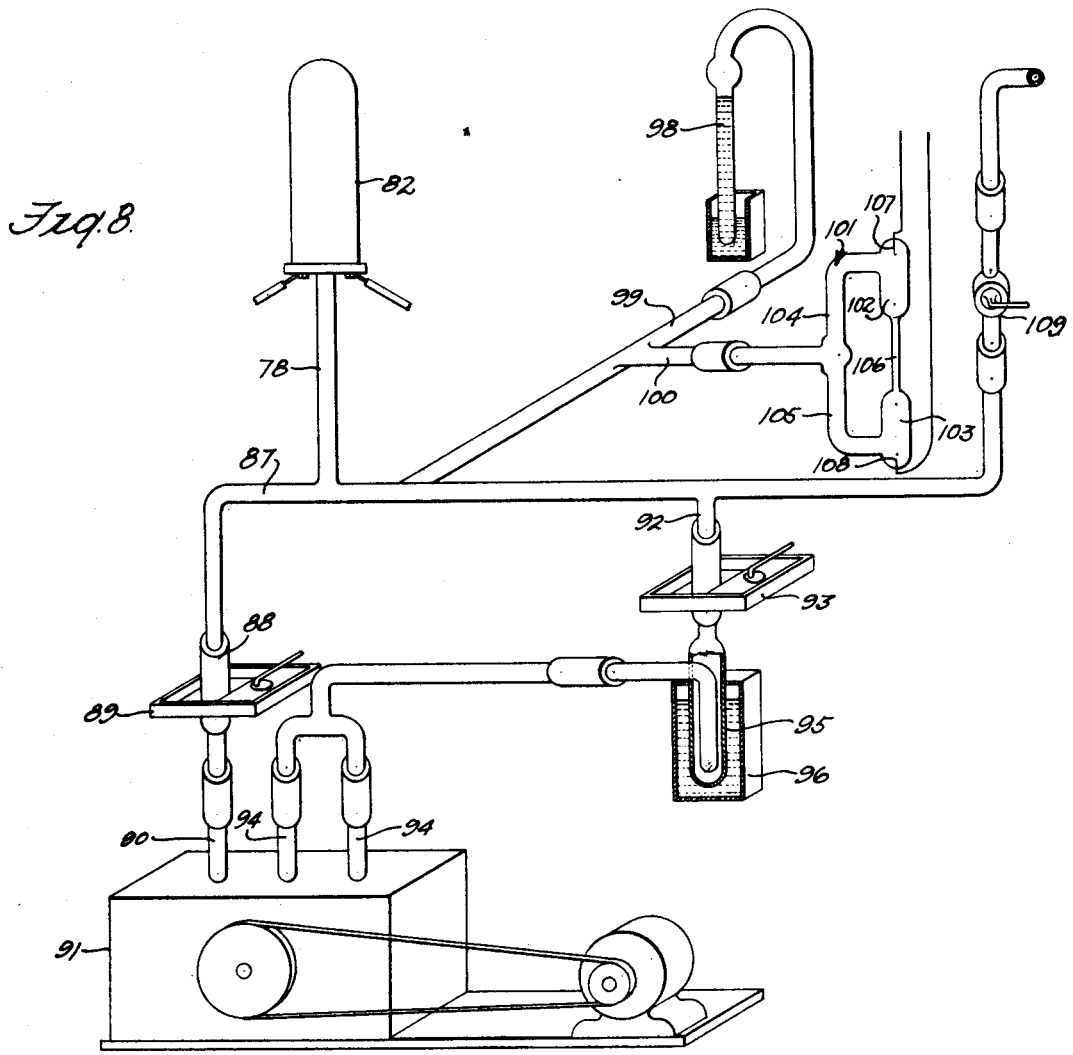
Fig. 8 is a diagrammatic view of the evacuating apparatus used in connection with the apparatus of Fig. 7 for heating and compacting the filament.

In this invention, a suitable compound of a metal of the yttrium group, for example, yttrium oxide, is subjected to electrolysis in a fused electrolyte that is not itself decomposed and that does not alloy or combine chemically with the deposited yttrium metal. Any suitable electrolyte having the above characteristics may be employed. An alkali of fluoride, such as sodium or potassium fluoride, preferably the latter, may be employed. An anode, such as graphite or carbon, that does not dissolve in the electrolyte, and a cathode of tungsten or equivalent metal that does not dissolve in the electrolyte nor react with the deposited yttrium at the temperatures of the bath, are employed. The yttrium metal is deposited on the cathode in the form of an adherent powder interspersed with salts or crystalline deposits from the electrolytic bath.

The cathode with its deposit is then removed from the bath and placed in water, whereupon the potassium flouride adhering from the bath dissolves, the deposited metal being thereupon free from the cathode as a fine powder but containing an anhydrous crystalline substance soluble in a boiling concentrated nitric acid. The latter is then dissolved in boiling concentrated nitric acid. Any remaining trace of the anhydrous crystalline substance is removed by vaporization at a white heat in vacuum. If the anode has not disintegrated to contaminate the cathode deposit by entrapped particles of carbon, the metal is in a condition to be worked up into filaments or other articles.

In the event, however, that some disintegration of the graphite or carbon anode has taken place and that particles of carbon may be contained in the metal deposit at the cathode, this carbon will combine with the metal or a portion of it to form a carbide when the washed deposit is subjected to an incandescent temperature. The presence of a carbide is immediately apparent from its characteristic odor when brought into contact with moisture or water. In the event that carbon is enclosed in the deposit, the metal containing the carbon is heated to a temperature of about 1000° to 1100° C. and treated with a current of carefully purified hydrogen, whereby the carbon combines with the hydrogen and is removed as a hydrocarbon. Good results have been obtained by treating in hydrogen before the vacuum process, and in most cases, is sufficient. The hydrogen employed for this purpose should be of the greatest purity in order to avoid contamination of the metal, and should be in sufficient excess to remove all of the carbon.

The metal thus obtained is of a dark grey color and is in the from of a powder. It may be formed into wire or other articles in any suitable manner. For this purpose a filament may be most conveniently formed by forming a paste of the metal with a suitable binder. To avoid a possible introduction of contaminating substances, yttrium hydroxide is preferably employed as a binder. This hydroxide is of a gelatinous nature and capable of cementing the particles of yttrium metals into a coherent mass. For this purpose ninety-five parts of the pure yttrium metal powder is mixed with five parts of yttrium hydroxide and ground in an agate mortar or other suitable grinding means. Five parts of pure paraffin wax are also added to the mixture during grinding for the purpose of enabling the paste to pass through a fine die, the wax serving as a lubricant. When the mixture has been reduced to a fine paste it is squeezed through a die of the proper dimensions to form a filament. It is then treated to remove the wax and to harden and bake the cemented mass and to decompose the hydroxide to yttrium metal. For this purpose the filament is placed between a pair of terminals in an electric circuit within a chamber that may be evacuated to a very high vacuum and the filament is heated. Before heating is begun, the chamber is subjected to a vacuum at which a cathode or X-ray discharge may be obtained, that is a vacuum having an absolute pressure of the order of magnitude of about one-thousandth of a millimeter of mercury. Heating is done very gradually to first vaporize the paraffin without appreciable decomposition, and to then heat the filament to redness. As the heat progresses to successively higher temperatures additional quantities of gas are given off. These gases are immediately removed to maintain a vacuum, the vacuum being tested by a discharge in a vacuum tube communicating with the chamber and the rising temperature of the wire being discontinued at a pressure above that indicated above. Heating is continued until the filament has been raised to a dazzling white temperature, for example, above 1500° C., whereupon the hydroxide will have been dissociated to the metal to the extent that no further gas will be given off. The filament now has a dense dark grey appearance and it may be mounted in an incandescent lamp or used for other related purposes.

Referring more particularly to the accompanying drawings in which an example of a preferred operation of the process and of an apparatus suitable therefor are shown, a body 10 of potassium fluoride is melted in a graphite crucible 11 together with a quantity of pure yttrium oxide ($Yt_2O_3$). The yttrium oxide should be of the greatest purity in order to avoid possibilities of contamination. The method of purification of the yttrium oxide is well known and forms no part of the present process. The quantity of yttrium oxide is in excess of that which will dissolve in the fused potassium fluoride, the excess dissolving to some extent, however, as the oxide is electrolyzed. The graphite crucible 11 is contained within and supported by a surrounding iron crucible 12 which is in turn enclosed in and supported by a nichrome crucible 13 having an outwardly projecting rim or flange 14 that rests on and is supported by the vertical walls of a furnace 15. The crucibles are heated by means of burners 16 in the lower part of the furnace 15, the products of combustion escaping through openings 17 at spaced intervals about the circumference of the flange 14. The anode is formed of a carbon rod 18 held at its upper end in a copper lead wire 19 to project downwardly below the surface of the electrolyte 10. The cathode is formed of a rod or wire 20 of tungsten supported at its upper end in a copper lead wire 21 and projecting downwardly into the fused electrolyte 10 and then bent in loops 22 encircling the graphite anode rod 18 and slightly spaced therefrom.

The crucible 11 is covered by a cover plate 23 having a body or boss 24 depending to very nearly the surface of the electrolyte 10 to displace the atmosphere above the electrolyte and having an opening 25 for the entrance of the anode and cathode. The opening 25 is further closed by means of a graphite disc 26 having a slot 27 to receive the anode and cathode.

In the electrolysis of the yttrium oxide a voltage of about two and one-half volts is employed between the anode and the cathode, the voltage varying somewhat with a variation in the distance between the anode and cathode. A cathode current density of about one and one-half amperes per square inch is preferred. High densities might be employed but they give rise to a danger of contamination of the resulting deposit of the yttrium metal. The current density at the anode will be somewhat greater. During the electrolysis the yttrium oxide is decomposed into the metal which deposits on the cathode loops 22 in a body as indicated at 28 in Fig. 3 while the oxygen is liberated at the anode and escapes or combines with the graphite to form carbon dioxide which escapes as a gas.

The electrolytic bath may be heated electrically, as for example in the apparatus shown in Fig. 4 of the drawings. In this apparatus the electrolytic bath is contained within a heat insulated heating chamber 29. The chamber 29 has an asbestos base 30 supported on legs 31 and an iron or metal outer wall 32 preferably of cylindrical form, and an inner wall 33 of alundum or other refractory material to form an annular space 34 that is filled with infusorial earth. The upper end of the space 34 is then closed by means of a ring 35 of transite or other suitable refractory material. The lower part of the space within the alundum wall 33 is filled with a mass of alundum cement 36 which is then covered by an alundum plate 37. There is thus formed a chamber within the wall 33 and above the plate 37 that is lined with a highly refractory material and is insulated against the escape of heat. In this chamber is placed a cylindrical ring 38 of alundum or other suitable refractory material having a spiral groove, or grooves on its outer cylindrical surface wrapped with a spiral or helix 39 of nichrome wire or other electric resistance element. One end of the helix 39 terminates in a lead wire 40 extending downwardly through the alundum cement 36, and the other end of the helix terminates in a lead wire 41 that extends into the refractory filling 34 and thence downwardly through the base 30 near its outer edge.

In the chamber formed within the cylindrical wall 38 is placed a graphite cup 42 in which a metallic cup 43, as indicated in Fig. 4, of copper or other suitable metal may be placed to serve as a receptacle for the electrolyte. This metal may have a carbon lining 43' which serves as a protector for the metal cup. The upper edge of the cylindrical wall 38 is protected by means of an annular plate or ring 44 on which rests an upper plate 45 having a central opening 46 and a pair of diametrically opposite slots 47. An anode 48 of graphite or other conductor insoluble in potassium fluoride is inserted through the opening 46 to project downwardly into the fused electrolyte. The upper end of the anode 48 is secured in the lower end of a copper rod 49 depending from a bracket 50 that is in turn slidably supported on an upright standard 51 mounted on the ring 35. The standard 50 rests on a flange or collar 52 fixed in position on the standard 51 to support the anode 48 at the proper height in the electrolytic bath. The bracket 50 may, however, be slipped upwardly on the standard 51 when the anode is being lifted out of the electrolyte. The copper rod 49 is connected to a positive source of electricity in any suitable manner not shown. The anode 48 is encircled by a cylindrical cathode 53 of copper, tungsten or other suitable metal and is supported by strips 54 of copper, tungsten or other suitable metal, that extend upwardly through the slits 47 in the cover plate 45. The opening 46 in the cover plate 45 is also closed by means of a disc or plate 55 having a central opening that closely encircles the anode 48. The copper strips 54 serve to support the cathode in its proper position in the bath and are connected in a suitable manner to the negative source of electricity. The bath is operated similarly to that shown in Fig. 1.

The cathode and its adhering deposit of yttrium metal is removed from the bath of potassium fluoride dipped into a body of water. The potassium fluoride which is enclosed between the particles of metal thereupon dissolves and causes the particles of yttrium to drop from the cathode and settle to the bottom of the water. The cathode is not attacked or dissolved to any appreciable extent. An anhydrous crystalline substance is also mixed with the yttrium metal and is not dissolved by the water. The deposit of yttrium metal is then freed of water and treated with boiling concentrated nitric acid which dissolves all of the anhydrous crystalline substance except that which is enclosed in the pores of the yttrium metal. The yttrium metal itself is not attacked by the concentrated nitric acid. It is then dried and heated to a white heat in a vacuum to vaporize the remaining enclosed crystalline substance. If no disintegration of the graphite anode or the graphite crucible has taken place and no carbon particles have been enclosed by the yttrium deposit, the metal is now in sufficient purity for working up into filaments or other articles. The absence of such carbon may be tested by wetting a part of the yttrium metal. If carbon is present in the metal mixture it will form a carbide in the subsequent heating and its presence will be indicated by the characteristic odor of the carbide. In the event that any carbide has been formed, the metal is placed in a platinum crucible 57, Fig. 6, supported in a furnace 58 and heated by a Bunsen or gas burner 59 to about 1000° to 1100° C. while a current of pure hydrogen is passed through a tube 60 entering the cover 61 of the crucible 57. At this temperature the hydrogen combines with the carbon of the carbide and passes through the space between the upper edge of the crucible, and the cover 61 thereby freeing the metal from the carbide. The metal is now in the form of a fine grey powder.

Figure 7:
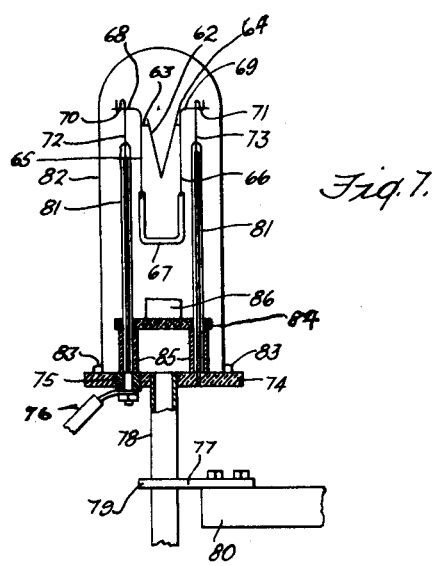
Fig. 7 is a sectional view of an apparatus for heating and compacting a filament of the metal.

To form the metal into a filament, ninety-five parts of this metal powder is mixed with five parts of pure yttrium hydroxide and five parts of pure paraffin wax and ground in an agate mortar to a smooth paste. The resulting paste is then forced through a die, having a fine diameter, for example, fifteen one-thousandths of an inch, to form a small filament. A length of the filament is then formed into a loop, such as the V-shaped loop 62 of Fig. 7. The ends of this loop are cemented by means of a tungsten or yttrium paste to a pair of fine wire terminals 63 and 64, which are in turn mounted on vertical wires 65 and 66, joined at their lower ends by a glass loop 67. The wires 65 and 66 have outward extensions 68 and 69 respectively by means of which they are hung onto hooks 70 and 71 on the upper ends of vertical conductor wires 72 and 73. The conductor 73 is mounted on a horizontal metal base 74, and the conductor 72 is mounted on the base 74 but is insulated therefrom by means of an insulating bushing 75. The conductor 72 is connected directly to an electric lead wire 76, and the conductor 73 is connected to a lead wire 77 through the metallic base 74 and a metal tube 78 passing upwardly therethrough. The base 74 is supported by means of a clamp 79 clamped to the tube 78 and supported on a bracket 80. The part of the conductors 72 and 73 projecting above the metallic base 74 are enclosed in and supported by glass sleeves 81 to very nearly their upper ends.

The conductors 72 and 73 and the elements supported thereon are enclosed in a glass bell 82, the lower edge of which rests on the plate 74 and is sealed air tight by means of a layer 83 of hard paraffin molded on the plate around the lower edge of the jar.

To prevent anything from dropping into the tube 78, a glass disc 84 may be mounted a short distance thereabove by means of glass collars 85, the edges of the disc 84 being spaced a short distance from the wall of the jar or bell 82. On the disc 84 is placed a container 86 having phosphorous pentoxide to absorb moisture. The exhaust tube 78 is connected to a pipe 87 having a connection through a rubber connector 88 and a control clamp 89 to a suction inlet 90 of a pump 91. The pump should be capable of producing a very high vacuum, for example a pump capable of producing a vacuum of less than one-thousandth of a millimeter of mercury, or less, of absolute pressure. The inlet 90 leads to a part of the pump at which the maximum vacuum is not produced but at which a rapid withdrawal of air is obtained. When a sufficient vacuum has been obtained through this inlet, the clamp 89 is closed and the pipe 87 is connected through a branch 92 and a control clamp 93 to higher vacuum inlets 94 of the pump. Placed between the control clamp 93 and the inlets 94 is a trap 95 which dips into a container 96 filled with solid carbon dioxide so as to chill the trap to a temperature at which any hydrocarbon vapors from the oil in the pump 91, that may vaporize at the extreme vacuum employed, are condensed and prevented from travelling backwardly through the pipes 92, 87 and 78 to the interior of the jar 82. A vacuum manometer 98 is connected through a pipe 99 to the tube 87 so that the aproximate vacuum may be readily noted. Also connected to the pipe 99 through a branch pipe 100 is a vacuum discharge apparatus 101 for indicating variations in the high vacuum employed during the process. The vacuum discharge apparatus 101 comprises a pair of enlarged chambers 102 and 103, connected by branch tubes 104 and 105 to the connecting tube 100 and to each other by a capillary tube 106, and having on opposite ends electrodes 107 and 108 connected to the opposite poles of an induction coil, not shown. The pipe 78 may also be connected through a valve 109 to other suction means for initially withdrawing air.

When the system has been evacuated to a point at which a green discharge is produced between the bulbs 102 and 103 through the capillary tube 106 and a bluish discharge through the tubes 104 and 105 disappears, current is passed from the wires 76 and 77 through the conductors 72 and 73, thence through the hooks 70 and 71 and the wires 65 and 66 and thence through the connecting filament 62. The filament 62 is heated very gradually by a suitable rheostat. For example, the current through the filament may be increased by connecting successive lamps in parallel arrangement and in series relation to the filament 62. The initial effect of the heating is to vaporize the paraffin at extremely low pressures, or high vacuum, at which it vaporizes at relatively low temperature without dissociation. When the paraffin has been removed, there remains nothing but the yttrium metal powder and the cementing hydroxide. As the temperature rises, the hydroxide begins to decompose to the oxide and the latter decomposes with an appreciable dissociation pressure of evolved oxygen. This oxygen is removed by the suction pump 91, and the heating of the filament to successively higher temperatures is so controlled that the pressure within the apparatus is kept within the limits indicated above, that is, a new lamp is not introduced into the circuit until the blue glow has disapeared from the branches 104 and 105 of the discharge apparatus and is cut out whenever this glow becomes too great until the gas has been removed sufficiently to justify a further increase in temperature. The temperature of the filament is thus increased until a dazzling white temperature is reached. It is preferred to heat the filament as rapidly as the capacity of the vacuum pump will permit. In the apparatus as shown diagrammatically in the drawings this may require a matter of from two to four hours, or even longer dependent on the size of the filament and the capacity of the vacuum pump.

While the process and the apparatus have been described in considerable detail in order to fully set forth the preferred conditions of operation, it will be understood that these details may be varied. Any diameter of filament within the range of those usable for incandescent filaments or for other purposes, such as electrodes, may be made. Other binders than yttrium hydroxide may be used, as for example metals of the yttrium group or of other groups of metals, where they do not form alloys of an objectionable low melting point, or the yttrium metal may be used alone by being compacted into a coherent mass or with a binder that does not leave a carbon residue when heated and driven off and that forms a coherent filament until the yttrium or erbium or other metal of the yttrium group shrinks to a coherent mass. As an electrolyte a fused salt is used that does not decompose under the conditions employed to deposit yttrium as a metal. Potassium fluoride is preferred as it is a compound of the most firmly united components and is, therefore, least subject to decomposition by the electrolysis.

While the invention has been described as being particularly applicable to the production of yttrium, it will be understood that it is applicable to forming other metals or mixtures of metals of the yttrium group, such as scandium, europium, gadolinium, terbium, dysprosium, holmium, erbium, thulium, ytterbium and lutecium.

It will be understood therefore that these and other details of the process are used in an illustrative and not in a limiting sense.

What I claim is:

1. A process of preparing yttrium which comprises subjecting a pure yttrium compound to electrolysis in a bath consisting of fused alkali fluoride.

2. A process of preparing yttrium which comprises subjecting a pure yttrium compound to electrolysis in a bath consisting of fused potassium fluoride.

3. A process of preparing yttrium which comprises subjecting pure yttrium oxide to electrolysis in a bath consisting of fused potassium fluoride.

4. A process of preparing yttrium which comprises subjecting pure yttrium oxide to electrolysis in a fused bath consisting of a fused alkali fluoride with a cathode current density sufficient to deposit yttrium without depositing a metal from the electrolyte.

5. A process of preparing yttrium which comprises electrolyzing pure yttrium oxide in fused potassium fluoride with a cathode current density of approximately one and one half amperes per square inch.

6. A process of preparing yttrium which comprises electrolyzing pure yttrium oxide in fused potassium fluoride with a cathode current density between about one and three amperes per square inch.

7. A process of preparing yttrium which comprises electrolyzing pure yttrium oxide in fused potassium fluoride with a cathode current density sufficient to deposit the yttrium without depositing a metal from the electrolyte.

8. A process of preparing yttrium which comprises electrolyzing pure yttrium oxide in fused potassium fluoride with a cathode current density sufficient to deposit yttrium without depositing metals from the fused electrolyte, removing the deposited yttrium and separating substances enclosed therewith.

9. A process of preparing yttrium which comprises electrolyzing pure yttrium oxide in fused potassium fluoride with a cathode current density sufficient to deposit yttrium without depositing metals from the fused electrolyte, removing the deposited yttrium, dissolving soluble salts in water, and then washing in hot concentrated nitric acid and heating to incandescence in vacuo.

10. A process of preparing yttrium which comprises electrolyzing pure yttrium oxide in fused potassium fluoride with a cathode current density sufficient to deposit yttrium without depositing metals from the fused electrolyte, removing the deposited yttrium, dissolving soluble salts in water, and then washing in hot concentrated nitric acid, and heating said metal in an atmosphere of hydrogen.

11. A process of preparing yttrium which comprises subjecting a pure yttrium compound to electrolysis in a fused single electrolyte that is not itself electrolyzed at the voltages and current densities required for the yttrium compound.

12. A process of preparing yttrium which comprises electrolyzing pure yttrium oxide in fused potassium fluoride with a cathode current density sufficient to deposit yttrium without depositing metals from the fused electrolyte, removing the deposited yttrium, dissolving the soluble salts in water and then washing in hot concentrated nitric acid.

13. A process for forming yttrium articles which comprises electrolyzing an yttrium compound in a bath of fused potassium fluoride freeing the resulting metal of adhering deposits from said bath, forming said metal into an article with a binder and dissipating said binder in vacuo.

14. A process of forming a filament which comprises electrolyzing an yttrium compound in a bath of fused potassium fluoride, freeing the resulting metal of adhering deposits from said bath, mixing said metal with a binder, drawing said metal into a filament and dissipating said binder in vacuo.

15. A process of forming filaments which comprises electrolyzing an yttrium compound in a bath of fused potassium fluoride, freeing the resulting metal from adhering deposits from said bath, mixing said metal with a binder comprising yttrium hydroxide, drawing the resulting composition into a filament form and heating said filament in vacuo to an incandescent temperature.

16. A process of forming filaments which comprises electrolyzing an yttrium compound in a bath of fused potassium fluoride, freeing the resulting metal of adhering deposits from said bath, mixing said metal with yttrium hydroxide and paraffin, forming the resulting mixture into a filament and heating said filament in vacuo to vaporize said paraffin and to reduce said yttrium hydroxide.

17. A process of preparing metals of the yttrium group which comprises subjecting a pure compound of a pure yttrium earth metal to electrolysis in a bath consisting of fused alkali fluoride.

18. A process of preparing metals of the yttrium group which comprises subjecting a pure oxide of said metal to electrolysis in a bath consisting of fused potassium fluoride.

19. A process of preparing metals of the yttrium group which comprises subjecting a pure oxide of said metal to electrolysis in a fused bath consisting of a fluoride of a metal having a high electro-motive potential with a cathode current density sufficient to deposit yttrium without depositing a metal from the electrolyte.

20. A process of preparing a metal of the yttrium group which comprises electrolyzing a pure oxide of said metal in a bath consisting of fused potassium fluoride with a cathode current density of approximately one and one-half amperes per square inch.

21. A process of preparing a metal of the yttrium group which comprises electrolyzing an oxide of said metal in a bath consisting of fused potassium fluoride with a cathode current density sufficient to deposit the metal without depositing a metal from the electrolyte.

22. A process of preparing a metal of the yttrium group which comprises electrolyzing a pure oxide of said metal in fused potassium fluoride with a cathode current density sufficient to deposit the metal of the yttrium group without depositing metals of the fused electrolyte, removing the deposited metal of the yttrium group and separating therefrom substances enclosed therewith.

23. A process of preparing a metal of the yttrium group which comprises electrolyzing a pure oxide of said metal in fused potassium fluoride with a cathode current density sufficient to deposit the metal of the yttrium group without depositing metals of the fused electrolyte, removing the deposited metal of the yttrium group, dissolving the soluble salts therefrom in water, and then washing in hot concentrated nitric acid.

24. A process of forming articles of metals of the pure yttrium group which comprises electrolyzing a pure compound of a metal of said group in a bath of fused potassium fluoride, washing the resulting metal free from enclosed deposits of said bath, forming said metal into an article with a binder, and dissipating said binder in vacuo.

25. An electrolytic bath for producing metals of the yttrium group which comprises fused potassium fluoride and a pure oxide of said metal in excess.

26. An electrolytic bath for producing metals of the pure yttrium group which comprises fused potassium fluoride and a pure compound of a metal of said group.

27. An electrolytic bath for producing yttrium metal comprising fused potassium fluoride and pure yttrium oxide in excess.

28. An electrolytic bath for producing metallic yttrium comprising fused potassium fluoride and a pure yttrium compound in excess.

29. An electrolytic bath for producing metallic yttrium which comprises fused potassium fluoride, pure yttrium oxide in excess and an anode insoluble in said fused potassium fluoride.

In testimony whereof, I affix my signature.

JOHN ALLEN HEANY.